US011369862B2

(12) United States Patent
Socorregut

(10) Patent No.: US 11,369,862 B2
(45) Date of Patent: Jun. 28, 2022

(54) SENSORY CHESSBOARD AND METHOD FOR DETECTING POSITIONS OF CHESS PIECES ON A CHESSBOARD AND TRANSMITTING THOSE POSITIONS TO A COMPUTER OR OTHER ELECTRONIC RECORDING DEVICE

(71) Applicant: ZmartFun Electronics, Inc., Miami, FL (US)

(72) Inventor: Roberto Socorregut, Miami, FL (US)

(73) Assignee: ZmartFun Electronics, Inc., Miami, FL (US)

( * ) Notice: Subject to any disclaimer, the term of this patent is extended or adjusted under 35 U.S.C. 154(b) by 764 days.

(21) Appl. No.: 15/653,150

(22) Filed: Jul. 18, 2017

(65) Prior Publication Data

US 2019/0022517 A1 Jan. 24, 2019

(51) Int. Cl.
*A63F 3/02* (2006.01)
*A63F 13/21* (2014.01)
(Continued)

(52) U.S. Cl.
CPC ............ *A63F 3/02* (2013.01); *A63F 3/00643* (2013.01); *A63F 9/24* (2013.01); *A63F 13/21* (2014.09);
(Continued)

(58) Field of Classification Search
CPC ........ A63F 3/02; A63F 3/00643; A63F 13/21; A63F 13/335; A63F 9/24;
(Continued)

(56) References Cited

U.S. PATENT DOCUMENTS

| 361,721 A | * | 4/1887 | Schmitthenner | .... A63F 3/00697 |
| | | | | 273/291 |
| 2,490,092 A | * | 12/1949 | Rippenbein | ......... A63F 3/00643 |
| | | | | 273/237 |

(Continued)

FOREIGN PATENT DOCUMENTS

| DE | 19821839 A1 | 11/1999 |
| JP | H02107288 A | 4/1990 |

OTHER PUBLICATIONS

Instructables; i'd like to make a rfid chess board that can record the position of the pieces in real time for game analysis,?; 2017; Website available at: http://www.instructables.com/answers/id-like-to-make-a-rfid-chess-board-that-can-recor/?sort=OLDEST&comments=#comments; Last accessed Oct. 27, 2017.

(Continued)

*Primary Examiner* — Michael D Dennis
(74) *Attorney, Agent, or Firm* — Simpson & Simpson, PLLC

(57) ABSTRACT

A chess board, comprising a top layer comprising sixty-four (64) squares of alternating color arranged in eight parallel ranks and eight parallel files, and a bottom layer comprising a circuit board, the circuit board comprising sixty-four (64) radio frequency identification antennas arranged in registration with the sixty-four (64) squares of alternating color in the top layer, and an electronic circuit operatively arranged to sense positions and movement of chess pieces on the sixty-four (64) squares of the top layer and communicate the positions and movement to a computer.

14 Claims, 14 Drawing Sheets

(51) Int. Cl.
A63F 13/335 (2014.01)
A63F 9/24 (2006.01)
A63F 3/00 (2006.01)

(52) U.S. Cl.
CPC .. *A63F 13/335* (2014.09); *A63F 2003/00457* (2013.01); *A63F 2009/2485* (2013.01); *A63F 2009/2489* (2013.01)

(58) Field of Classification Search
CPC .... A63F 2003/00457; A63F 2009/2489; A63F 2009/2485
USPC ......................................................... 273/260
See application file for complete search history.

(56) References Cited

U.S. PATENT DOCUMENTS

| | | | |
|---|---|---|---|
| 3,843,132 A | 10/1974 | Ferguson | |
| D287,146 S | 12/1986 | Lin | |
| D296,909 S | 7/1988 | Lin | |
| 4,981,300 A * | 1/1991 | Winkler | A63F 3/00643 |
| | | | 273/237 |
| 5,082,286 A * | 1/1992 | Ryan | A63F 3/00643 |
| | | | 273/238 |
| 5,129,654 A | 7/1992 | Bogner | |
| 5,188,368 A * | 2/1993 | Ryan | A63F 3/00643 |
| | | | 273/237 |
| 5,393,074 A * | 2/1995 | Bear | A63F 9/0291 |
| | | | 273/440 |
| 5,577,730 A | 11/1996 | Vannozzi, Sr. | |
| 5,719,648 A * | 2/1998 | Yoshii | G02F 1/1309 |
| | | | 324/760.02 |
| 5,772,208 A | 6/1998 | McTaggart | |
| 5,791,648 A * | 8/1998 | Hohl | G06K 7/085 |
| | | | 273/238 |
| 5,853,327 A * | 12/1998 | Gilboa | A63F 13/06 |
| | | | 463/39 |
| 6,168,158 B1 * | 1/2001 | Bulsink | A63F 3/00643 |
| | | | 273/237 |
| 6,371,380 B1 * | 4/2002 | Tanimura | G06K 19/07749 |
| | | | 235/492 |
| 6,489,899 B1 | 12/2002 | Ely et al. | |
| 6,835,131 B1 | 12/2004 | White et al. | |
| 7,051,945 B2 * | 5/2006 | Empedocles | B82Y 10/00 |
| | | | 235/492 |
| 7,245,392 B2 * | 7/2007 | Quach | H04N 1/00413 |
| | | | 358/1.15 |
| 7,561,053 B2 | 7/2009 | Hecht et al. | |
| D599,308 S * | 9/2009 | Blumberg, Jr. | D13/182 |
| 7,599,561 B2 | 10/2009 | Wilson et al. | |
| 7,704,135 B2 * | 4/2010 | Harrison, Jr. | A63F 9/24 |
| | | | 463/14 |
| 7,753,276 B2 | 7/2010 | Gelbman | |
| 7,852,223 B2 | 12/2010 | Hect et al. | |
| 7,898,505 B2 | 3/2011 | Blythe et al. | |
| 8,025,573 B2 * | 9/2011 | Stenton | A63F 13/02 |
| | | | 463/43 |
| 8,297,513 B2 | 10/2012 | Wallace et al. | |
| 8,480,469 B2 | 7/2013 | Haltovsky et al. | |
| 8,517,383 B2 | 8/2013 | Wallace et al. | |
| 8,540,579 B2 | 9/2013 | Richard et al. | |
| 8,602,857 B2 * | 12/2013 | Morichau-Beauchant | |
| | | | A63F 3/00643 |
| | | | 463/9 |
| 8,613,657 B2 | 12/2013 | Richard et al. | |
| 8,974,295 B2 | 3/2015 | Maharbiz et al. | |
| 9,071,287 B2 | 6/2015 | Siddiqui | |
| 2004/0160005 A1 | 8/2004 | Krise et al. | |
| 2006/0175753 A1 * | 8/2006 | MacIver | A63F 3/00643 |
| | | | 273/237 |
| 2006/0261547 A1 * | 11/2006 | Uzuanis | A63F 9/12 |
| | | | 273/157 R |
| 2007/0247700 A1 * | 10/2007 | Makowski | G09B 19/00 |
| | | | 359/322 |
| 2008/0297317 A1 * | 12/2008 | Oberle | A63F 3/00006 |
| | | | 340/10.1 |
| 2011/0032101 A1 | 2/2011 | Hecht et al. | |
| 2013/0123009 A1 * | 5/2013 | Maharbiz | A63F 3/00643 |
| | | | 463/31 |
| 2013/0259150 A1 * | 10/2013 | Ruland | A63F 5/00 |
| | | | 375/267 |
| 2015/0021854 A1 * | 1/2015 | Hilario | A63F 3/00028 |
| | | | 273/260 |
| 2015/0148116 A1 | 5/2015 | Maharbiz et al. | |
| 2016/0004894 A1 * | 1/2016 | Tanikawa | G06K 19/07773 |
| | | | 340/10.51 |
| 2016/0059115 A1 * | 3/2016 | Camaratta, Jr. | A63F 3/00697 |
| | | | 53/452 |
| 2017/0018140 A1 * | 1/2017 | Yamaguchi | A63F 1/067 |
| 2017/0091495 A1 * | 3/2017 | Horie | G06K 13/073 |

OTHER PUBLICATIONS

YouTube; UHF RFID-based Electronic Chess; Apr. 18, 2012; Video available at: https://www.youtube.com/watch?v=dpp8gGnpSgM; Last accessed Oct. 27, 2017.

Whirlpool; Custom RFID Solutions; Jan. 11, 2012; Forum available at: http://forums.whirlpool.net.au/archive/1846238; Last accessed Oct. 27, 2017.

All About Circuits; RFID Antenna Multiplexing; Feb. 7, 2010; Forum available at: https://forum.allaboutcircuits.com/threads/rfid-antenna-multiplexing.34064/; Last accessed Oct. 27, 2017.

Texas Instruments; Low Cost HF RFID Multiplexer Examples; Oct. 2009; Application Report available at: https://www.promelec.ru/pdf/Low_Cost_HF_RFID_Multiplexer_Examples.pdf; Last accessed Oct. 27, 2017.

IB Technology; RFID Reader with Multiplexed Antennas; Aug. 2016; Website available at: http://www.ibtechnology.co.uk/wp-content/uploads/2016/08/IBTECH_CaseStudy_RFID-Reader-with-Multiplexed-Antennas.pdf; Last accessed Oct. 27, 2017.

Chess Live Broadcasting Systems & More . . . ; RFID Chessboard; Jan. 12, 2016; Website available at: http://eitschess.de/index.php/en/broadcasting-system/rfid-chessboard; Last accessed Oct. 27, 2017.

Texas Instruments; Multiplexing Multiple RFID Antennas; Mar. 27, 2012; Forum available at: https://e2e.ti.com/support/wireless_connectivity/nfc_rfid/f/667/t/178349; Last accessed Oct. 27, 2017.

DGT Digital Game Technology; Weighted Electronic Chess Pieces; 2016; Website available at: http://www.digitalgametechnology.com/index.php/news/526-coming-soon-weighted-dgt-chess-pieces; Last accessed Dec. 11, 2017.

Chesshouse.com; Millennium Chess Computer—Chess Genius Exclusive; Copyright 2017; Website available at: https://www.chesshouse.com/products/millennium-chess-computer-chess-genius-exclusive; Last accessed Dec. 13, 2017.

* cited by examiner

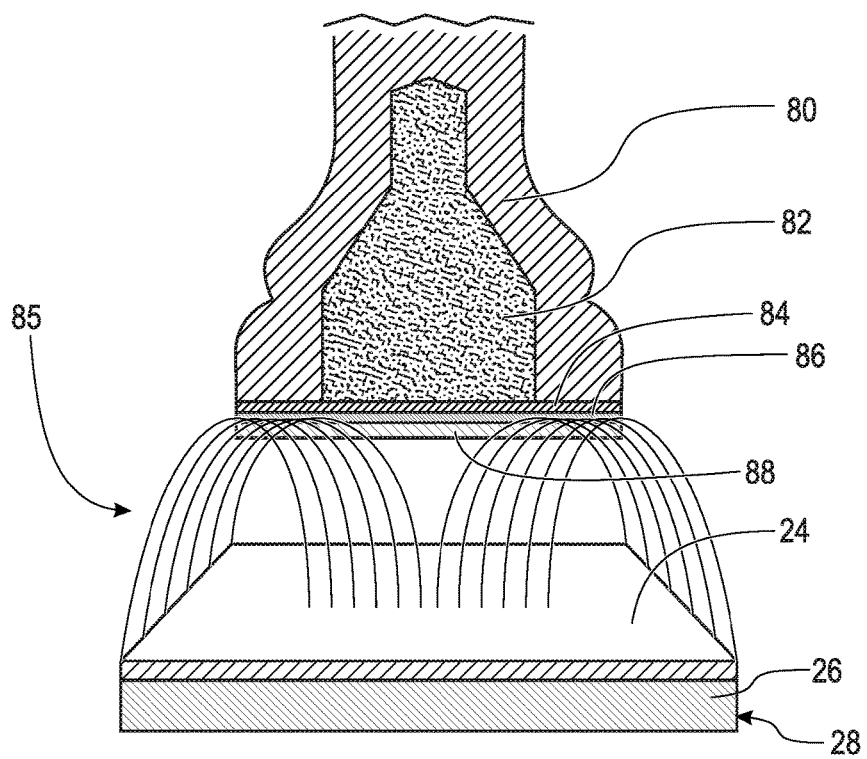
Fig. 5A
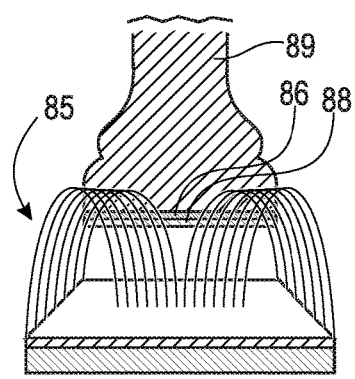 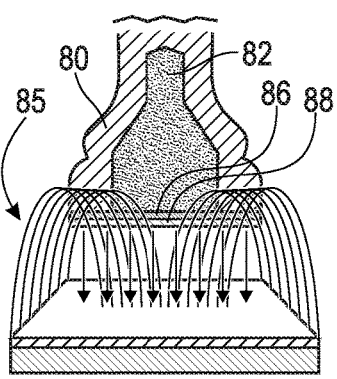 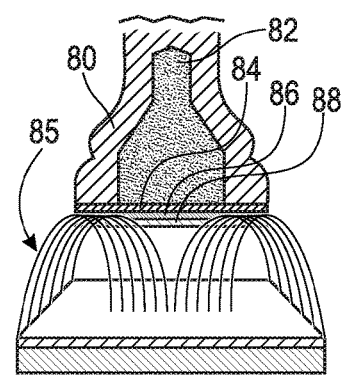
Fig. 5B       Fig. 5C       Fig. 5D

SENSORY CHESSBOARD AND METHOD FOR DETECTING POSITIONS OF CHESS PIECES ON A CHESSBOARD AND TRANSMITTING THOSE POSITIONS TO A COMPUTER OR OTHER ELECTRONIC RECORDING DEVICE

FIELD OF THE INVENTION

The present invention relates to a sensory chess board and a method for detecting positions of chess pieces on a chessboard and transmitting those positions to a computer. Specifically, the method and chess board uses radio frequency identification (RFID) technology.

COMPUTER PROGRAM LISTING APPENDIX

The present application includes a computer program listing appendix. The computer program listing is intended to comprise a part of the complete written description of the invention pursuant to 35 U.S.C. § 112. The appendix contains ASCII text files of the computer program as follows:

| Name | Date Created | Size |
|---|---|---|
| cdc_demo.txt | 5/18/2016 4:09 AM | 2 KB |
| cdc_desc.txt | 5/18/2016 4:09 AM | 9 KB |
| gen_demo.txt | 5/18/2016 4:09 AM | 1 KB |
| gen_desc.txt | 5/18/2016 4:09 AM | 7 KB |
| hid_demo.txt | 5/18/2016 4:09 AM | 2 KB |
| hid_desc.txt | 5/18/2017 11:36 PM | 9 KB |
| ja_demo.txt | 5/18/2016 4:09 AM | 2 KB |
| ja_desc.txt | 5/18/2016 4:09 AM | 9 KB |
| mcHIDInterface.txt | 7/20/2009 1:42 AM | 5 KB |
| Mchpcdc.txt | 5/18/2016 4:09 AM | 4 KB |
| MSSCCPRJ.txt | 7/10/2015 5:58 PM | 2 KB |
| RFID-CHESS-BOARD-06A(DLP-RFID2-03302017.txt | 5/9/2017 11:36 PM | 131 KB |
| RFID-Chess-Board-06a(DLP-RFID2-03302017 (2).txt | 5/9/2017 11:36 PM | 1,976 KB |
| RFID-CHESS-BOARD-06A(DLP-RFID2-03302017 (3).txt | 5/9/2017 11:36 PM | 7 KB |
| RFID-Chess-Board-06a(DLP-RFID2-03302017 (4).txt | 6/21/2017 10:00 AM | 33 KB |
| usb_cdc.txt | 5/18/2016 4:09 AM | 43 KB |
| usb_cdc (2).txt | 5/18/2016 4:09 AM | 15 KB |
| usb_dev.txt | 5/18/2016 4:09 AM | 94 KB |
| usb_dev (2).txt | 5/18/2016 4:09 AM | 7 KB |
| usb_gen.txt | 5/18/2016 4:09 AM | 19 KB |
| usb_gen (2).txt | 5/18/2016 4:09 AM | 5 KB |
| usb_hid.txt | 5/18/2016 4:09 AM | 26 KB |
| usb_hid (2).txt | 5/18/2016 4:09 AM | 7 KB |
| usb_mem.txt | 5/18/2016 4:09 AM | 7 KB |
| USBProject-TouchScreen.txt | 8/6/2015 4:49 PM | 47 KB |
| USB-RFID-Board-02(070915).txt | 8/6/2015 4:49 PM | 4 KB |

BACKGROUND OF THE INVENTION

The game of chess is played by more people than any other game in the world. It is estimated that approximately 500 million people know how to play chess. It is played by millions of people worldwide in homes, parks, clubs, online, by correspondence, and in tournaments. Often called "the royal game", chess is a two-player strategy board game played on a chessboard, a checkered game board with 64 squares arranged in an eight-by-eight grid. The game is played by amateurs and professionals alike.

All professional and many amateur players belong to a national chess federation in the country in which they reside. For example, most serious American chess players belong to the United States Chess Federation (USCF). In turn, the Fédération Internationale des Échecs or World Chess Federation is an international organization that connects the various national chess federations around the world and acts as the governing body of international chess competition. It is usually referred to as FIDE, its French acronym. Professional and serious amateur chess players often play in "rated" tournaments in games played in accordance with national federation rules. For example, USCF rated tournament games are played in accordance with USCF rules, whereas FIDE, rated tournaments are played in accordance with FIDE rules.

Chess ratings are used to indicate the relative strength of players, based on his or her performance versus other players. They are used by organizations such as FIDE, USCF, and many other national chess federations. Most of the ratings systems are used to recalculate ratings after a tournament or match but some are used to recalculate ratings after individual games. In almost all systems a higher number indicates a stronger player. In general, players' ratings go up if they perform better than expected and down if they perform worse than expected. The magnitude of the change depends on the rating of their opponents.

In tournament chess, the rules require that each player record his or her moves. This is typically done on a scoresheet (e.g., pencil and paper) but may also be done with an electronic recording device such as a Monroi™ device or a Plycounter® device. It is important and sometimes necessary to record moves in order to resolve disputes when one of the players has made an illegal move. Tournament directors often consult player scoresheets to resolve these disputes. Chess moves are recorded according to well-known standards of notation.

Probably the most popular and most used notation used to record chess games today is Algebraic Chess Notation. In this notation, the ranks (horizontal rows) of chess square are identified by the numbers 1-8, as shown in FIGS. 1 and 2; and the files are identified by the letters a-h, also as shown in FIGS. 1 and 2. Using this system, each square on the chess board can be identified by a unique "letter-number" designation. For example, in FIGS. 1 and 2, which shows the starting position for a chess game, it is seen that there is a black King on square e8, and a white Rook on squares a1 and h1. In FIG. 2, for example, the square d5 has been labelled to illustrate that each of the 64 squares can be identified by a unique letter-number designation. Algebraic Chess Notation replaced Descriptive Chess Notation, at least in most English speaking countries, beginning in the 1970s. Other chess notation systems are known, but used less frequently, such as Figurine Algebraic Notation. Moreover, there are various types of Algebraic Notation, including Standard Algebraic Notation (SAN), standardized by FIDE, Figurine Algebraic Notation (FAN), Long Algebraic Notation (LAN), Minimal Algebraic Notation, Reversible Algebraic Notation, and Figurine Reverse Algebraic Notation. Chess Notation is explained in detail in U.S. Chess Federation's Official Rules of Chess, Edited by Tim Just, $6^{th}$ Edition, 2014, Chapter 3, which complete book is incorporated herein by reference.

An example of a scoresheet using Algebraic Chess Notation for a chess game is as follows:

| R. Simpson v. R. O'Mara | | |
|---|---|---|
| 01-17-2015 | | |
| 1. | e4 | e5 |
| 2. | d4 | exd4 |

-continued

R. Simpson v. R. O'Mara
01-17-2015

| 3.  | c3   | Nf6  |
| --- | ---- | ---- |
| 4.  | e5   | Nd5  |
| 5.  | Bc4  | Nb6  |
| 6.  | Bb3  | Nc6  |
| 7.  | cxd4 | Bb4  |
| 8.  | Nc3  | O-O  |
| 9.  | Nf3  | h6   |
| 10. | O-O  | Bxc3 |
| 11. | bxc3 | Kh8  |
| 12. | Qd3  | d5   |
| 13. | Bc2  | g6   |
| 14. | Bxh6 | Bf5  |
| 15. | Qe2  | Rg8  |
| 16. | Bg5  | Qd7  |
| 17. | Bf6  | Rg7  |
| 18. | Ng5  | Ne7  |
| 19. | Nxf7 | Kh7  |
| 20. | Ng5  | Kg8  |
| 21. | Bxf5 | Nxf5 |
| 22. | f4   | Re8  |
| 23. | Rf3  | Rh7  |
| 24. | Nxh7 | Qxh7 |
| 25. | Rh3  | Nh6  |
| 26. | g4   | Nd7  |
| 27. | Bg5  | Kf7  |
| 28. | Rxh6 | Qg7  |
| 29. | Qb5  | Ke6  |
| 30. | Qxb7 | Rb8  |
| 31. | f5   | Kf7  |
| 32. | Qxd5 | Ke8  |
| 33. | f6   | Qf8  |
| 34. | e6   | Nxf6 |
| 35. | Bxf6 | Qxf6 |
| 36. | Qd7  | Kf8  |
| 37. | Rf1  | Rb1  |
| 38. | Rh8# |      |

In the game above, on move 1, White moved his pawn from e2 to e4, and Black responded by moving his pawn from e7 to e5. Note that only the squares occupied by the moved pieces (e4 and e5) are designated since it is understood that only pawns originally positioned on e2 and e7, respectively, could have legally moved to e4 and e5. In Black's second move, a pawn on e5 captured White's pawn on d4, as indicated by the notation exd4. On Black's eighth move, he castled kingside, as indicated by the notation O-O. White won the game by checkmate on his thirty eighth move as indicated by the notation #.

Serious players transfer their games from their scoresheets or electronic recording device into a computer for analysis by a chess engine (a computer program that plays chess and analyzes and evaluates chess positions). For example, the moves from the above notated game can be input into a computer program and then the moves can be displayed graphically on a monitor. This helps players to learn from mistakes made during games, as the computer chess engines can point out inaccuracies, mistakes and blunders and suggest the strongest moves in any position. Moreover, many of these rated games, especially among higher rated players (such as Masters, International Masters, and Grand Masters) are accumulated, and sometimes annotated, in large databases. Perhaps the best known chess database product is sold under the trademark Chessbase™, produced by Chessbase GmbH of Hamburg, Germany. These large databases include millions of previously played games, and are used to study all aspects of the game, including the opening, middle game and end game, and are also used by high level players to prepare for opponents by studying their previous games.

Finally, chess books and instructional videos all use chess notation to explain and teach the game.

There is such strong interest in high level chess tournaments that many tournament organizers now routinely transmit games in these tournaments over the Internet. For example, all games of the World Chess Championship and the United States Chess Championship are broadcast live over the Internet with running commentary by International Grand Masters and other strong players. This is only possible because the games are played on a "sensory" chessboard which is connected to a computer and functions to transmit the moves and positions from the board to the computer.

Chess is also played online by many people on a variety of websites, and via various Smart Phone applications. For example, at virtually any minute on any given day, hundreds, if not thousands of chess games are being played online at the ICC (Internet Chess Club) or on Chess.com by players from all over the world. Although it is possible to play online chess games with just a computer, a monitor and a mouse, it is also possible to use the above-described sensory chess board to play online chess using a real chess board and pieces. The sensory chess board senses the position of the pieces on the board, and communicates those positions to the computer, which then transmits the moves and positions to the opponent over the Internet. Electronic sensory chess boards, then, enable the game pieces to be identified by both color and piece type from any of the 64 squares on the board within a short period of time. This data can be uploaded to a computer and then analyzed by software to provide players with information such as review of gameplay movements, computer determination of the best moves and a list of all the moves played, as well as allowing the public to watch gameplay via online streaming. It also enables online play between two players.

Various types of sensory chess boards are known in the art. These boards generally use one of three different types of sensors: magnetic, push-buttons, or resonance coils. For example, a sensory board known as Chess 232 Board was a magnetic sensory board with wooden pieces, first released in late 1994. Novag Universal Electronic Chess Board was a wooden chess board with magnetic sensors released in 1996. Saitek PC Auto Chessboard was a magnetic sensory wooden chess board released by Saitek in 1995. SciSys Leonardo was a dedicated chess computer having a wooden magnetic sensory board released in 1986. SolusChess is a DIY magnetic sensory chess board from Berger's DIY projects which uses reed switches as sensors, developed between 2012-14. Another sensory board, known as the TASC SmartBoard, used resonant coils to sense pieces in the 1990s, but this board was discontinued after a patent infringement lawsuit in 1997, related to U.S. Pat. No. 5,129,654.

As of 2017, the predominant sensory chess board in use in tournament play is the "DGT e-Board" manufactured and sold by DGT B.V., of Enschede, The Netherlands. The DOT e-Board is described in detail in U.S. Pat. No. 6,168,158 (Bulsink). The patented invention uses a plurality of both transmit and receive coils in the chess board that interact with signals from resonance coils in the game pieces to determine the identity and position of each chess piece on discrete squares on the board. The coils are arranged in rows and columns, corresponding to the ranks and files of the chess board so that both transmit and receive coils underlie each square. These coils are connected to a control device, which decodes the unique resonance signals of the pieces to determine type and placement.

DGT's boards are made of wood and, accordingly, are somewhat expensive. The company's standard board, which connects to a computer via a USB port, sells in the United States for approximately $850.00, and the advanced Bluetooth version, which is connectable via either USB or Bluetooth, currently sells for approximately $1100. Obviously, this chess board is not a cost effective option for the majority of chess players. Most chess players simply can't afford to spend hundreds of dollars for a chess board, or even a chess set (which includes a board and pieces). The vast majority of chess players use flexible, vinyl or mousepad-type chess boards and plastic pieces, since these are much more affordable.

A further problem with the DGT pieces is that the pieces used with this board are exceedingly light in weight. Chess players prefer to play with "heavy" pieces. As such, most plastic and wood chess pieces are weighted, usually with a slug of lead. Lead is a metal. Unfortunately, a lead slug embedded in a typical wood or plastic chess piece would interfere with the electrical signals between the piece and the DGT board due to eddy currents and resultant electromagnetic fields. The manufacturer itself has recognized this problem with its technology ("Placing metal weights in the handcrafted pieces is impossible as it interferes with the frequencies . . . "). http://www.digitalgametechnology.com/index.php/news/526-coming-soon-weighted-dgt-chess-pieces?mavikthumbnails_display_ratio=1.75.

Another system for detecting game pieces is described in U.S. Pat. No. 7,852,223, which describes a method of using RFID (radio frequency identification) tags to locate game chips on a board. The pieces contain a RFID device which encodes a unique number that can then be detected by antenna coverage patterns. The grid of antennas receive respective response signals unique to the RFID of a certain game chip or chip type and allow for detection of multiple chip types within one playing board. These wide antenna coverage patterns do not work for games, such as chess, where the detection range must be limited to one square on a chess board. Thus, this system is only practical for large table casino style games.

U.S. Pat. No. 8,297,513 describes both a method and system for identifying game pieces by means of fixed conductive rings attached at the bottom of each game piece, which encode a number for that piece based on the diameter and number of rings. Through a processor and program memory in the game board, the identity of each game piece can be determined regardless of the orientation of the piece by a sensory assembly. This system does not account for the movement of game pieces, which is critical in analysis of active playing in any board game, such as chess.

Thus, there has been a long-felt need for a sensory chess board, and a method of communication between chess pieces, a chess board, and a computer, which overcomes the above-identified problems.

BRIEF SUMMARY OF THE INVENTION

The present invention broadly comprises a chess board, comprising a top layer having sixty-four (64) squares of alternating color arranged in eight parallel ranks and eight parallel files; a bottom layer comprising a circuit board, the circuit board comprising sixty-four (64) radio frequency identification (RFID) antennas arranged in registration with the sixty-four (64) squares of alternating color in the top layer; and, an electronic circuit operatively arranged to sense positions and movement of chess pieces on the sixty-four (64) squares of the top layer, and communicate the positions and movement to a computer.

The invention also broadly comprises a chess piece having a body, the body having a cavity therein, a metal weight positioned within the cavity, a ferrite sheet positioned below the metal weight and in proximity thereto, and, an RFID tag positioned below the ferrite sheet, the MD tag secured to the body. The antenna in the RFID tag is tuned to a corresponding antenna under a square in a chessboard.

The invention also broadly comprises a chess set, comprising the sensory chess board recited above, and a set of chess pieces, where each chess piece includes an RFID tag which uniquely identifies the piece, and is operatively arranged to interact electronically and electromagnetically with the RFID antennae embedded in the sensory chess board of the invention.

The invention also broadly comprises a method of identifying the positions of chess pieces on a chess board, and communicating those positions to a computer or other electronic recording device.

The sensory chess board of the invention also includes an internal memory that is operatively arranged to save a plurality of games, and all moves made in each game, even in the absence of a connection of the board to a computer.

The chess pieces of the invention may be made of wood, plastic or any other suitable material, and may be either weighted or unweighted.

The chess board of the invention may be made of wood, vinyl, open cell sponge rubber with polyester (so-called "mouse pad material"), may be rigid or flexible, and may be made of any other suitable material. A printed circuit board, rigid or flexible, is embedded in the board.

A general object of the invention is to provide a sensory chess board which uses radio frequency identification to identify the identity and position of each chess piece, and is operatively arranged to record each move in a chess game played on the board, and to transmit those moves to a computer.

Another object of the invention is to provide a sensory chess board as described above and a set of weighted chess pieces operatively arranged to interact with the board.

A further object of the invention is to provide a method of identifying the identity and position of chess pieces on a chess board using RFID technology, and of recording moves and saving games played on the board.

These and other objects, features and advantages of the present invention will become apparent upon a reading of the following detailed description, in view of the drawings and claims.

BRIEF DESCRIPTION OF THE DRAWINGS

The invention is described in detail below with reference to the drawings, wherein:

FIG. 5A is a cross-sectional fragmentary partially exploded view of a representative square of the chess board of the invention, and of a weighted chess piece positioned atop the square, to illustrate the electromagnetic flux lines formed as a result of the unique structure of the chess piece;

FIG. 5B is a view similar to that of FIG. 5A but showing an unweighted chess piece positioned atop the square;

FIG. 5C is a view similar to that of FIG. 5B but showing a weighted chess positioned atop the square, but without a ferrite layer 84 positioned above RFID tag 86;

FIG. 5D is an identical, albeit smaller, view of the chess piece positioned atop the square in FIG. 5A;

DETAILED DESCRIPTION OF THE INVENTION

Figure 1:
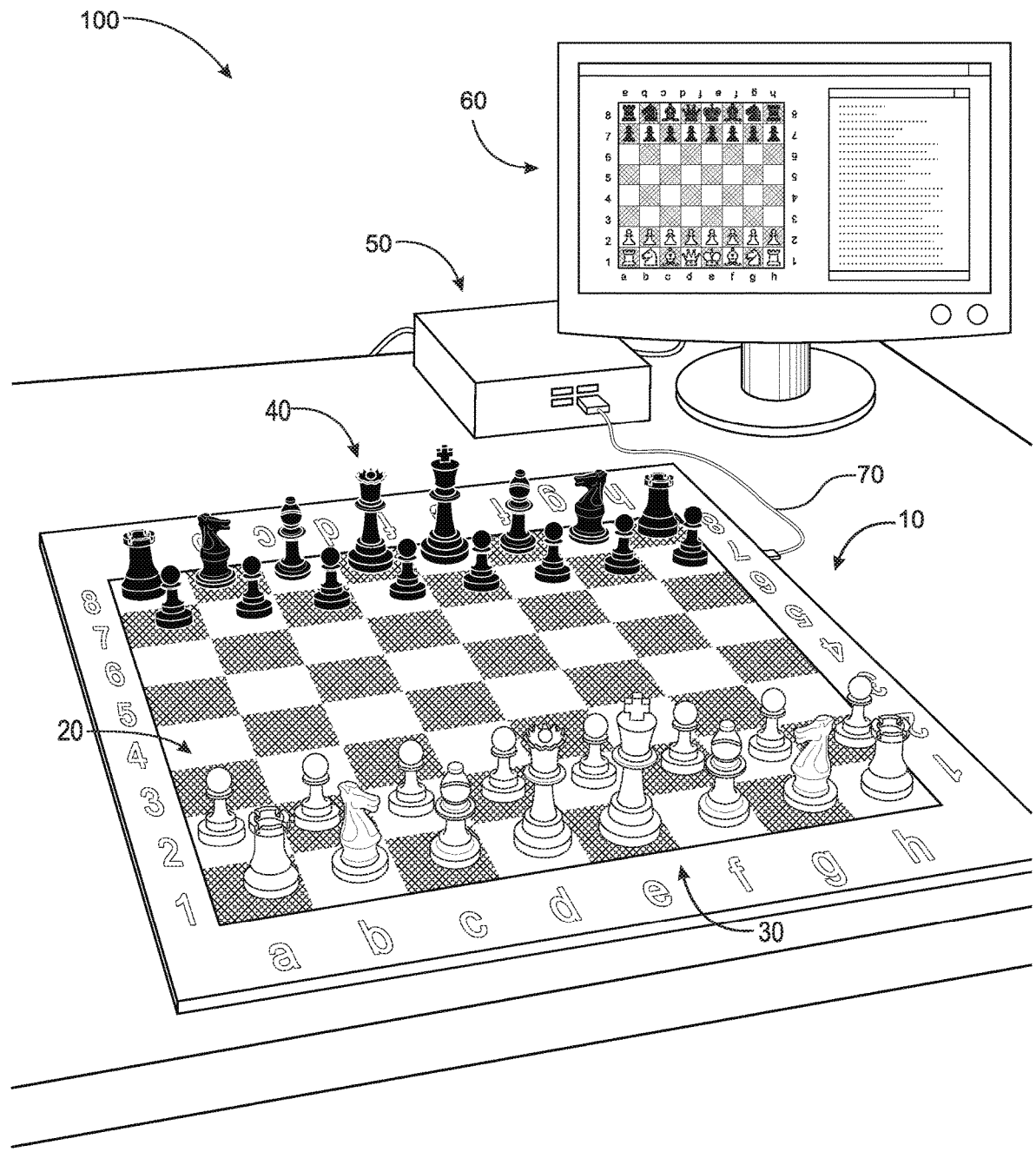
FIG. 1 is a perspective view of a typical set-up of the sensory chess board of the present invention, in combination with the chess pieces of the invention, where the board is connected and in communication with a computer, and the moves and positions of the pieces are displayed on a monitor connected to the computer.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Adverting now to the drawings, as described above, FIG. 1 is a perspective view of the sensory chess board of the present invention shown connected to a computer/monitor via a USB cable. It should be appreciated that the board could be connected wirelessly to the computer via any wireless technology, such as by a wireless area network or by Bluetooth® connection. The board itself may be made of any suitable material, such as wood, plastic, rubber, vinyl, or the like. It may be rigid or flexible. A printed circuit board is embedded within the board. As is well known, the board itself contains sixty-four (64) squares of alternating color as shown in the drawing. Chess players refer to the squares as "black" and "white", or "dark" and "light", respectively, although the squares may be of any color. The files on the board are labelled "a-h" and the ranks are labelled "1-8" to facilitate recording moves using algebraic notation.

In use, electronics in the circuit board (RFID antennas, etc.) sense the position and identity of each chess piece and transmit that position and identity to the computer as will be described in detail infra. The computer then displays the position of the pieces on the monitor. The moves and positions are also stored, both in an on-board memory, and also on the computer hard drive.

Figure 2:
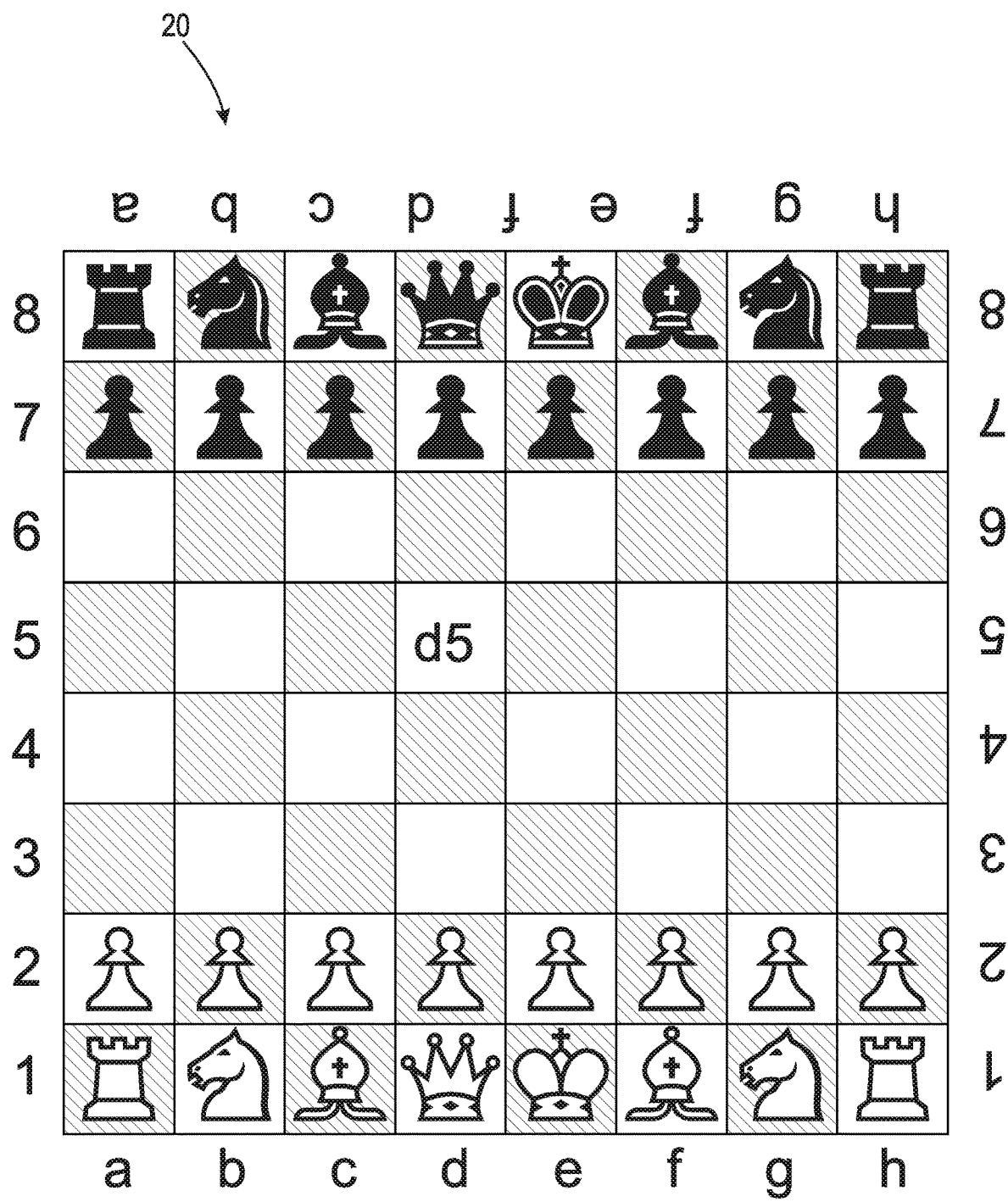
FIG. 2 is a 2-dimensional representation of a chess board containing chess pieces in their starting positions prior to a game, illustrating the labeling of the ranks and files of the board, and identification of each square to facilitate use of Algebraic Notation to record the moves of a game, and to identify the location of pieces on the board.

As described previously, FIG. 1 is a perspective view of sensory chessboard system 100, comprising sensory chessboard 10, shown connected to computer 50 via USB connector 70, where moves and the positions of the pieces on the actual board are displayed on computer monitor 60. Chessboard 10 is seen to comprise top layer 20, comprising 64 squares of alternating colors, as is well known in the art. Shown in position atop the board in their initial starting positions are white pieces 30 and black pieces 40. Each set of white and black pieces include the well-known chess pieces: King, Queen, Bishops, Knights, Rooks and Pawns. As described supra, the letters a-h are used to designate files (a row of alternating color squares oriented vertically), and the numbers 1-8 are used to designate ranks (a row of alternating color squares oriented horizontally). These rank and file designations allow unique identification of every square on the chessboard. For example, as shown in the drawing, a white Rook is positioned on square a1; another white Rook is positioned on square h1; the black Queen is positioned on square d8, and so on. Similarly, FIG. 2 is a schematic 2-dimensional drawing which illustrates the actual chessboard shown in FIG. 1, showing all the squares and the positions of the pieces. This is the type of image that would appear on a typical computer which is sensing the positions on board 10.

As will be described in more detail infra, each chess piece in FIG. 1 comprises an RFID tag affixed on or at its base, and this tag contains information that uniquely identifies that chess piece. The board includes 64 RFID antennas, with one antenna located directly beneath every square. These antennas are operatively arranged to emit electromagnetic signals in the direct vicinity of its particular square, to receive a return signal if a particular chess piece is positioned on that square, and to send that piece identity and position information to the computer.

Figures 3A, 3B:
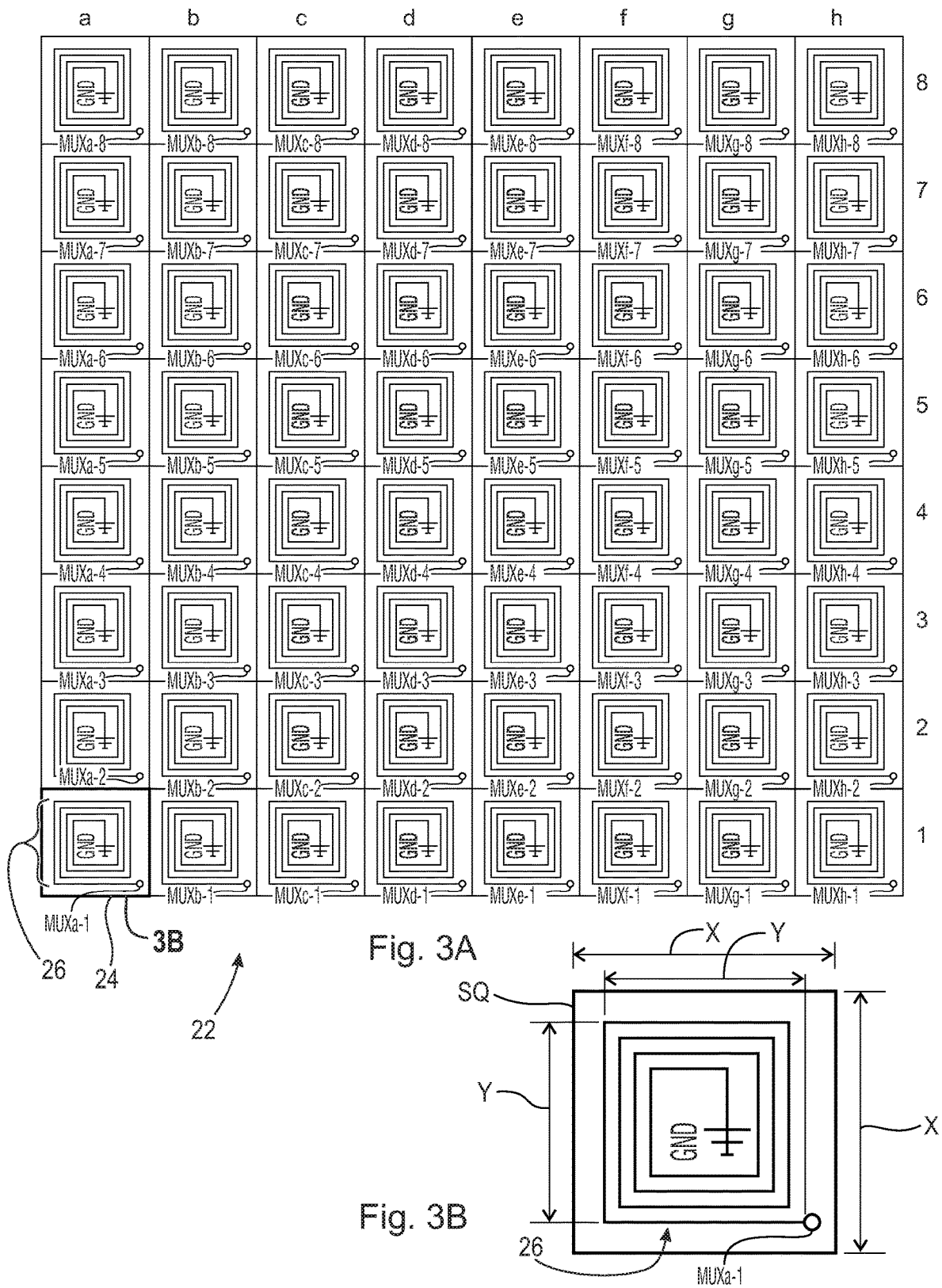
FIG. 3A is a schematic representation of the sixty-four (64) RFID antennas arranged within the sixty-four (64) squares of the chessboard of the invention.
FIG. 3B is an enlarged view of a schematic representation of the RFID antenna arranged under the a1 square of the chess board.

FIG. 3A is a schematic circuit diagram illustrating 64 identical radio frequency identification antennas 26, where each antenna is operatively arranged to sense and identify a chess piece on an associated square 24 on printed circuit board 28, which is in registration with a single square on chessboard 10 shown in FIG. 1. The antennas are coils etched into the printed circuit board. The coils are etched into the top side of the printed circuit board, closest to where the chess pieces will be located. (The remaining electronic components are mounted on the underside of the printed circuit board in a preferred embodiment. In a preferred embodiment, the number of coil turns and separation between traces are determined in such a way as to tune each antenna to 1.92 µH. As shown in FIG. 3A, each antenna is labelled with the prefix "MUX" followed by a number. For example, antenna MUXa-8 is shown to be positioned under the a8 square; antenna MUXb-1 is shown to be positioned under the b1 square, and so on. One end of the coil of each antenna is connected to a common ground. The other end of the coil is connected to the microcontroller as each square is scanned, as will be described infra. In a preferred embodiment, the antennas are all identical, and they are all centered beneath each chessboard square.

The size and spacing of the antenna coils is important. The coils cannot be so large, and so close to an adjacent coil that the antenna cannot discern the identity of a piece placed therebetween; nor should the coil be so small such that when a piece is close to the edge of a square, it won't be detected. In a preferred embodiment, with reference to FIG. 3B, the dimension X, which is the square size on the chessboard, is equal to 2.25", and the dimension Y, which is the length and width of the coil, is equal to 1.375", although other dimensions of both the chessboard square, and the coil are obviously possible. In the preferred embodiment described above, there is a distance of 0.438" surrounding each coil, as measured from the outermost coil turn to the border of the square under which it is positioned. It should be noted that tournament chessboards are known to have standard size squares, such as 2.25", 2.375" and 2.5".

Figure 4:
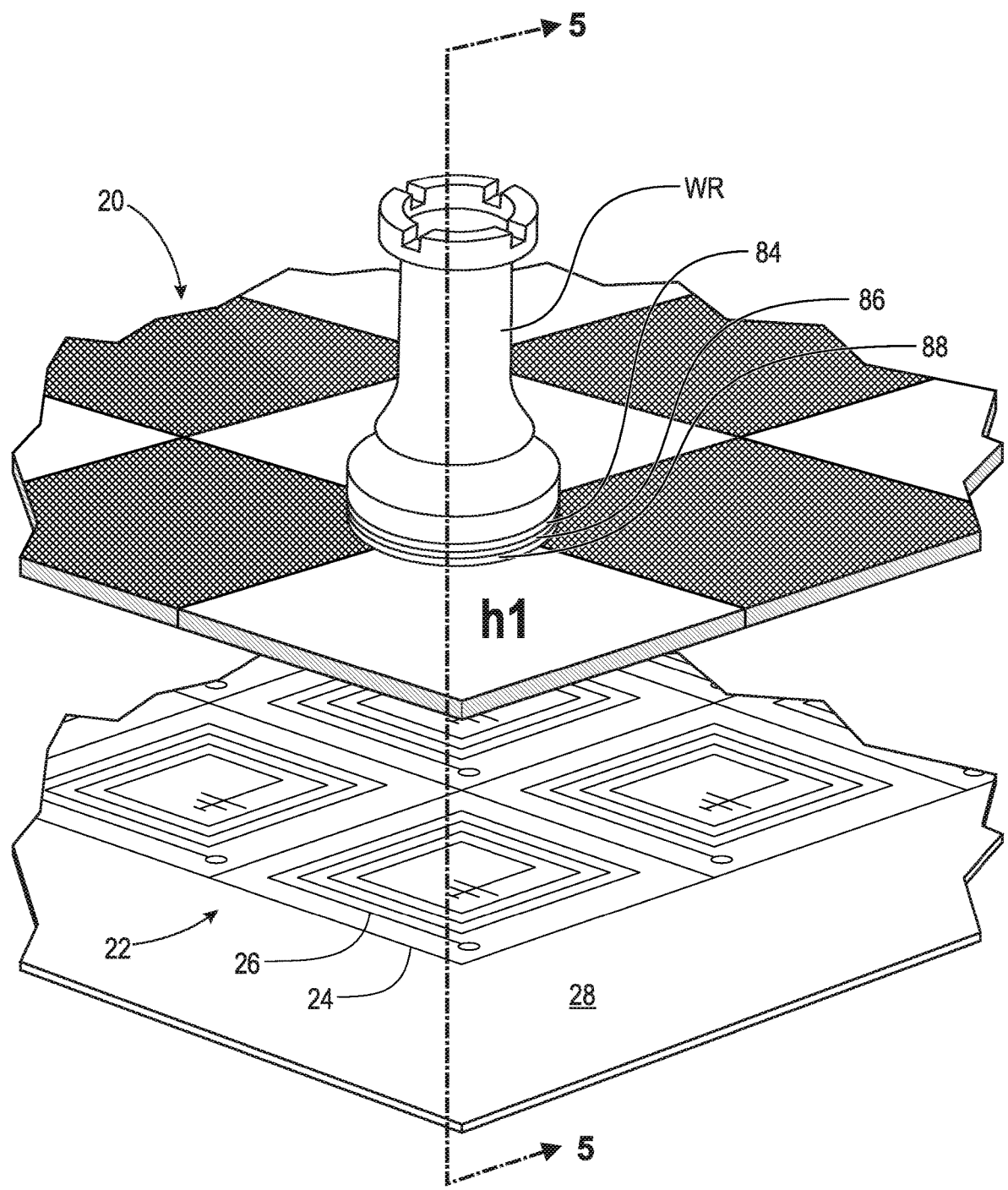
FIG. 4 is a perspective, exploded, fragmentary view of the chess set of the invention, showing a white rook on the h1 square, in position above an RFID antenna in a printed circuit board under the h1 square.

FIG. 4 is a perspective, exploded, fragmentary view of the chess set of the invention, showing a white rook on the h1 square, in position above RFID antenna 26 in a printed circuit board under the h1 square. This particular antenna is labelled MUXh-1 in FIG. 3A. This drawing shows that chessboard 10 comprises top layer 20 and bottom layer 28, where bottom layer 28 is a printed circuit board. As shown in the drawing, white square h1 is in registration with and directly aligned atop square 24 of the printed circuit board. Also shown in the drawing is white rook WR, which includes an RFID tag 86 and a base pad 88 secured to the endcap. In a preferred embodiment, the base pad may be made of felt, billiard cloth, leather, or the like. The RFID tag is in communication with a corresponding antenna beneath the square on which the white rook is perched.

There are major technical problems associated with sensing a chess piece atop a chess board, regardless of the method of detection used. One of these problems is caused by the traditional weighting of chess pieces by metal slugs, such as lead. The problem is the generation of eddy currents about the surface of the weighting slugs, and subsequent interference with communication between the piece and the board electronics as a result of disturbance of the electromagnetic field. FIGS. 5A-5D illustrate this problem and the unique solution provided by the chess pieces of the present invention. FIG. 5A is a cross-sectional fragmentary partially exploded view of square h1 shown in FIG. 4, and of white rook WR positioned atop the square, taken generally along line 5-5 in FIG. 4. This view shows the weighted chess piece and its components, and the unique electromagnetic flux fields produced by the combination of RFID antenna 26 in combination with the chess piece. As seen in the drawing, WR includes body 80, and lead weight 82 positioned in a cavity in the body. Although a lead slug is used to weight the piece in a preferred embodiment, other types and compositions could be used—such as metal and the like. The body of the chess piece may be made of wood, plastic, ivory, resin, bone, marble, ceramic or any other suitable material. Ferrite layer 84 is placed below weight 82. In a preferred embodiment, ferrite layer 84 is made from a flexible sintered ferrite sheet, such as MHLL5040-000 ferrite sheet available from Laird in Earth City, Mo. The ferrite layer acts as a reflective barrier for the electromagnetic flux emitted by the chess board antennae. This layer prevents the flux from reaching the metal weight in the chess piece. RFID tag 86 is fixedly secured to the bottom of the chess piece, after the tag has been programmed to uniquely identify the piece. In a preferred embodiment, the tag is an ISO15693 RFID tag. In a preferred embodiment, both the antenna in the board and the antenna in the RFID tag are tuned to a center frequency of 13.56 MHz. Finally, base pad 88 is secured to the chess piece below the RFID tag. In less expensive chess sets the base pad is made of felt; in more expensive sets the base pad is made of billiard cloth or leather.

FIG. 5B illustrates a scenario where an unweighted chess piece 89 is used with the sensory chessboard of the invention. In this scenario, with no metal present in the chess piece, there is no interference of the electromagnetic flux produced by the antenna in the board. The antenna in RFID tag 86 should easily receive the signal transmitted by the antenna since both antennae are tuned to a center frequency of 13.56 MHz, which is the main carrier frequency of the RFID module.

FIG. 5C illustrates the scenario where chess piece 80 includes lead slug 82 as a weight, and this slug interferes with the electromagnetic flux produced by the chessboard antenna. Some of this flux is absorbed by the lead slug, and the flux creates Eddy currents on the surface of the slug which, in turn, creates a secondary electromagnetic field. The net result of the Eddy currents and the secondary electromagnetic field is a detuning of the antennae in the board and in the RFID tag, making them unusable.

Finally, FIG. 5D is a view similar to that of FIG. 5A, where the above problems have been uniquely solved by the placement of ferrite layer 84 between lead slug 82 and RFID tag 86. The ferrite layer reflects the electromagnetic flux and avoids interference caused by Eddy currents and secondary electromagnetic fields. It should be appreciated that ferrite layer 84, RFID tag 86, and base pad 88 may be affixed to the chess piece, and to each other, in any suitable way, such as by adhesive.

It should be appreciated that, although the RFID tag and the ferrite layer may be two separate elements, that these elements could be combined as a single unit, and are known in the art as RFID anti-metal tags, RFID tags for metal, anti-metal RFID labels, and metal adhesive RFID labels. They are typically made of special rubber magnetic sticky film in combination with an electronic tag on a back side. This type of tag technically successfully solves the issue of eliminating electromagnetic interference in reading an RFID tag when it is attached to a metal surface.

Figure 6:
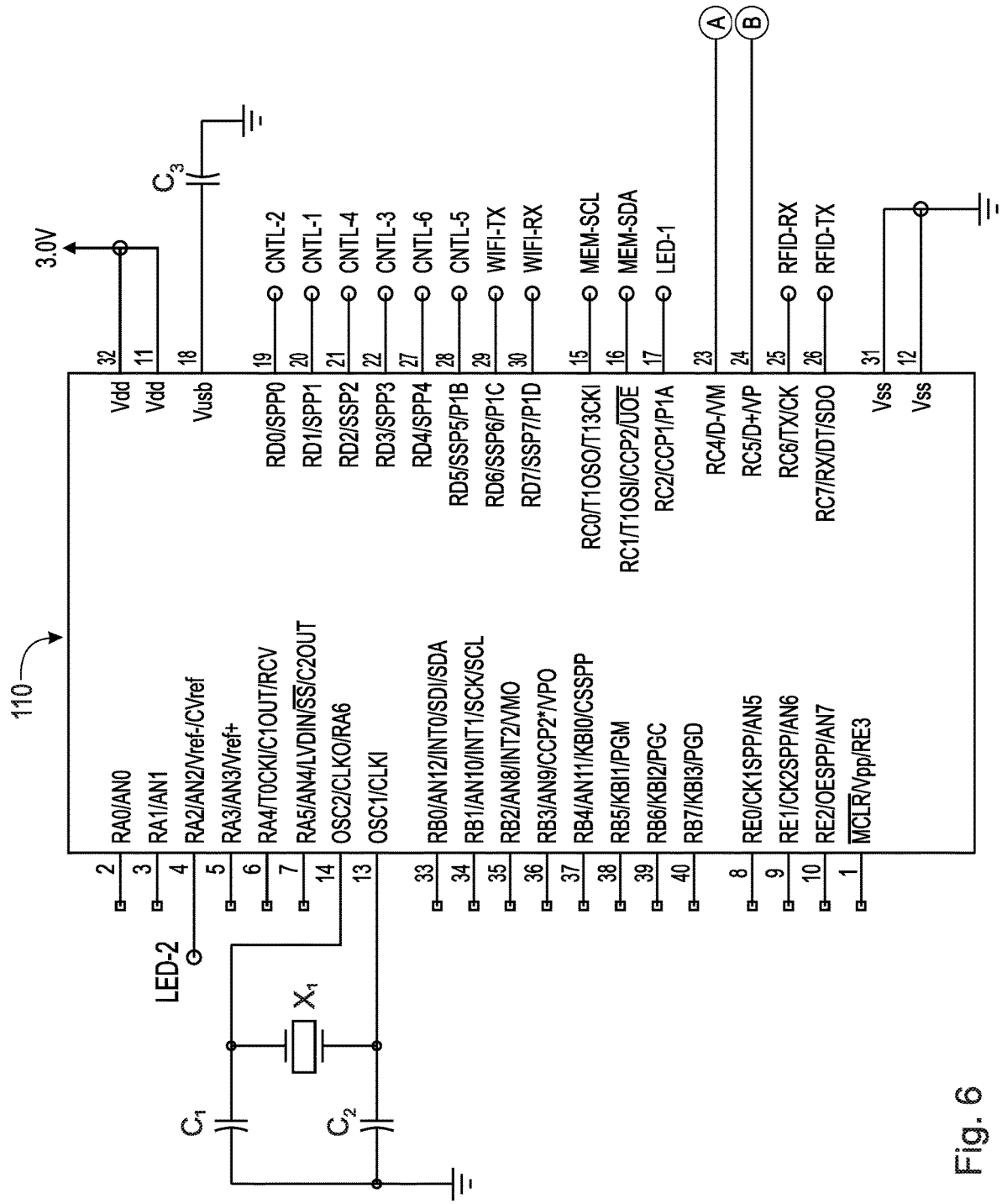
FIG. 6 is a schematic view of microcontroller 110 of the present invention.
Figure 7:
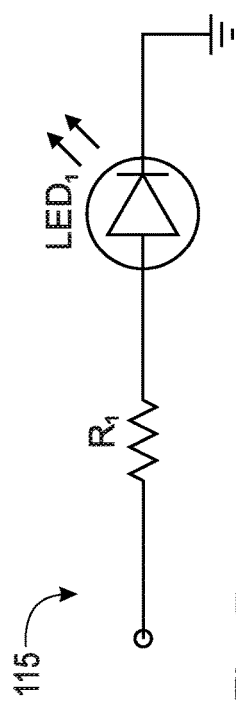
FIG. 7 is a partial schematic view of the control circuit of the present invention.
Figure 8:
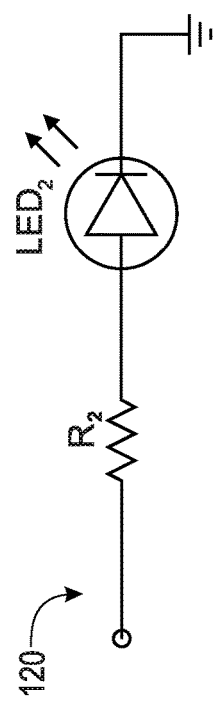
FIG. 8 is a partial schematic view of the control circuit of the present invention.
Figure 9:
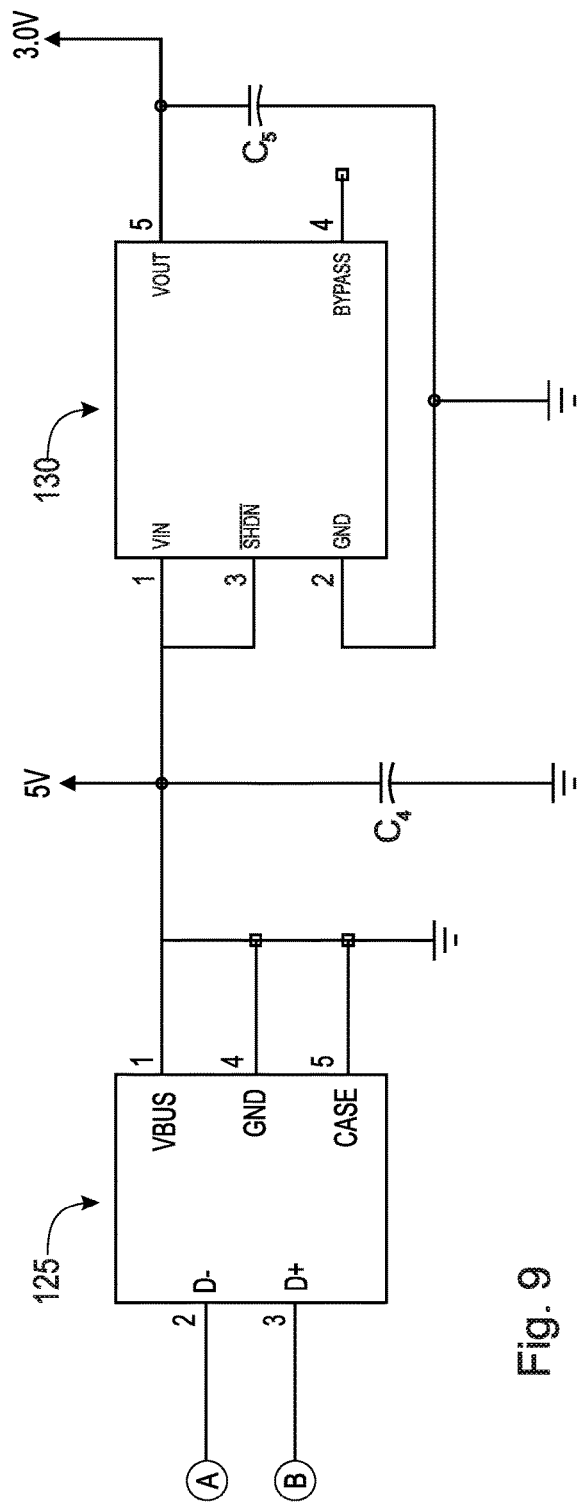
FIG. 9 is a partial schematic view of the control circuit of the present invention.

FIG. 6 is a schematic view of microcontroller 110 of the present invention. In a preferred embodiment, microcontroller 110 is model PIC18F4550, manufactured by Microchip Technology Inc. Quartz crystal oscillator is configured with capacitors $C_1$ and $C_2$ to provide a 4 MHz signal to the microcontroller via pins 13 and 14, as is well known in the art. The microcontroller is arranged to constantly communicate with RFID module 150 shown in FIG. 12. In a preferred embodiment, RFID module 150 is a model DLP-RFID2 SMT Module manufactured by DLP Design, Inc. The module is a low-cost, compact module for reading from and writing to high frequency RFID transponder tags via an internal or external antenna. It has the ability to both read and write data in addition to reading the unique identifier (UID). All of the electronics on this module reside on a single, compact printed circuit board, and all operational power is taken from one 3.0 to 5.0 volt power supply.

Figure 10:
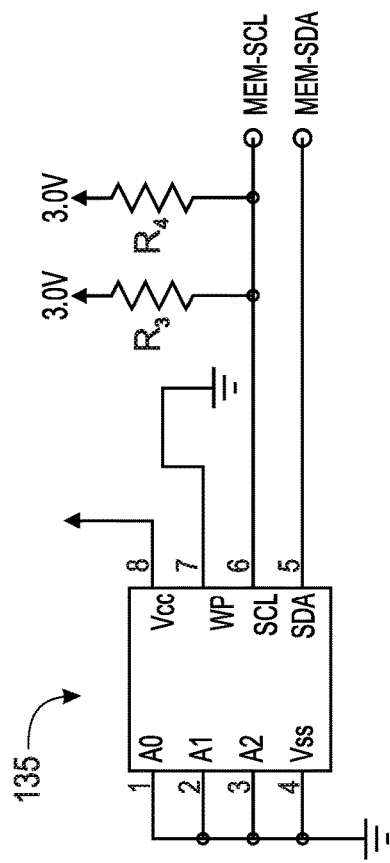
FIG. 10 is a partial schematic view of the control circuit of the present invention.

The microcontroller also communicates with EEPROM 135, shown in FIG. 10. The microcontroller only writes to the EEPROM when there is a change in position on the board. The purpose of the EEPROM is to record the moves in each game, and to record a number of games played on the board. In a preferred embodiment the EEPROM is 512 KB. This size memory permits recording of approximately 13,000 games, where each game is approximately 40 moves in length (where one move is defined to be one move by white and one move by black). In a preferred embodiment, EEPROM 135 is a model 24FC512, manufactured by Microchip Technology, Inc., or equivalent.

Figure 11:
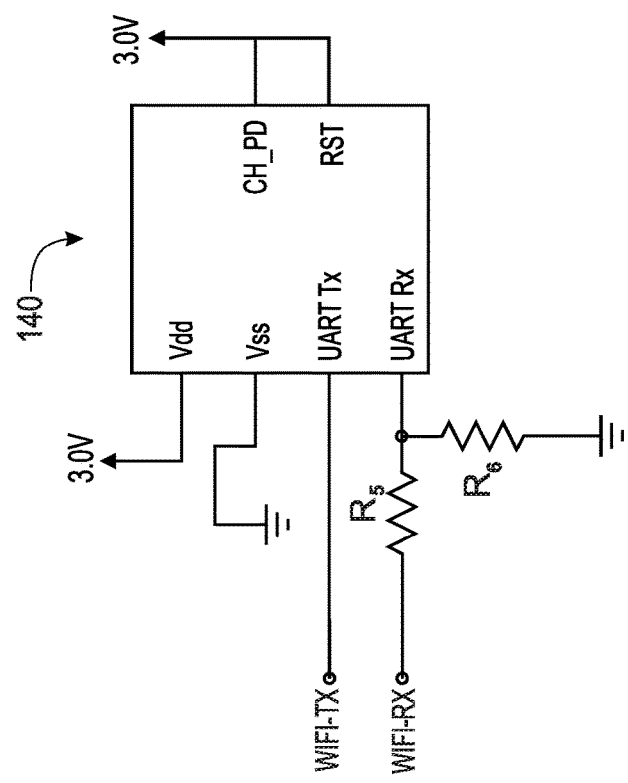
FIG. 11 is a partial schematic view of the control circuit of the present invention.

The microcontroller is also operatively arranged to communicate with WiFi module 140, shown in FIG. 11. Module 140 can function as a WiFi host or as a WiFi adapter (slave), communicating with a router in an existing WiFi network. This module, in combination with the microcontroller, can transmit moves of games being played on the chessboard over a WiFi network, for reception by a computer, or for communication and broadcast over the Internet. In a preferred embodiment, module 140 is a model ESP8266EX manufactured by Espressif Systems. This module provides a complete, self-contained WiFi networking solution. When hosting an application, the module boots up directly from an external flash. It has an integrated cache to improve the performance of the system in this application. Alternatively, when serving as a WiFi adapter, the module provides wireless internet access to the microcontroller. One of the advantages of this module also being capable of serving as a host is the ability of someone to locate and communicate with the sensory board of the present invention from a laptop, smart phone, or similar device, and download the games stored in that board, or watch a game in progress live. For example, in a strong tournament, a spectator or even a competitor may wish to download, view and then study all the games played on Board 1 (traditionally the highest rated player begins the tournament on Board 1, and then the players who perform the best in that tournament plays on Board 1). Often, the most interesting, or at least the highest level, games are played on Board 1.

Microcontroller 110 is also operatively arranged to connect via a serial connection to an external chess clock, such as a digital chess clock. This connection allows the clock time display for each player to be communicated to a computer and displayed on the computer monitor. It also permits the times of each move to be recorded in EEPROM 135. It is also envisioned that the clock times could be communicated from the clock to the system wirelessly via WiFi module 140.

Voltage regulator 130 converts the 5V USB bus voltage supplied by USB connector 125 to 3V. Most of the circuit components of the invention operate at 3V. In a preferred embodiment, voltage regulator 130 is Model TC1185 manufactured by Microchip Technology Inc.

LED assembly 115 includes $LED_1$ and resistor $R_1$. In a preferred embodiment, $LED_1$ is green. If this LED is active, the user knows that everything is operating normally. LED assembly 120 includes $LED_2$ and resistor $R_2$. In a preferred embodiment $LED_2$ is red. If there is an issue with the board, the circuit, or the software, $LED_2$ will light red.

Figure 12:
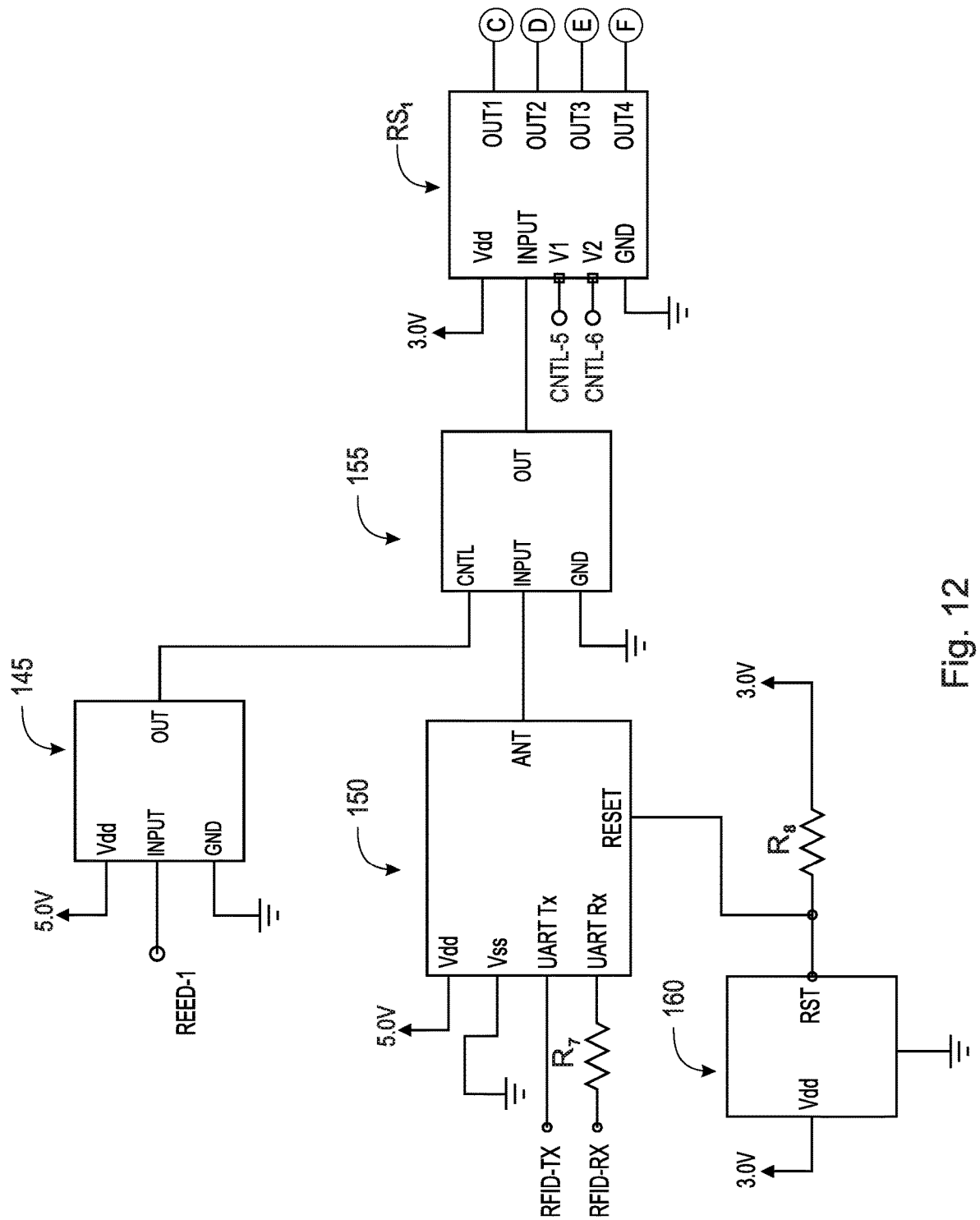
FIG. 12 is a partial schematic view of the control circuit of the present invention.

RFID module 150, shown in FIG. 12, controls the transmission of signals from the RFID antenna array, and the processing of the received signals from the RFID tags on the pieces. It does this by controlling a plurality of RF multiplexer switches shown in FIGS. 13A-13E, as described infra. The RFID module, of course, in in turn controlled by microcontroller 110. Voltage monitor 160 monitors the voltage supplied to the RFID module, to prevent corruption of firmware in the RFID module. The RFID module is very sensitive to low voltages. In a preferred embodiment, if the voltage drops below a preset level (e.g., 3V), monitor 160 shuts down the RFID module to prevent corruption. In a preferred embodiment, monitor 160 is model TLV803 manufactured by Texas Instruments.

Optoisolator 145 is a switch which controls relay 155 which, in turn, communicates the multiplexing signals between RFID module 150 and the first multiplexing switch $RS_1$, in the system. Any solid state switch could be used in lieu of optoisolator 145, as is well known in the art. In a preferred embodiment optoisolator model LCA110L by IXYS Integrated Circuits Division is used in the multiplexing circuit of the invention. Relay 155 is a standard relay well known in the art, and is only necessary if the first switch/multiplexer $RS_1$ in the array needs the RFID signal to be off before changing its on/off state. In a preferred embodiment, relay 155 is Model 9007 by Coto Technology, Inc.

Figure 13A:
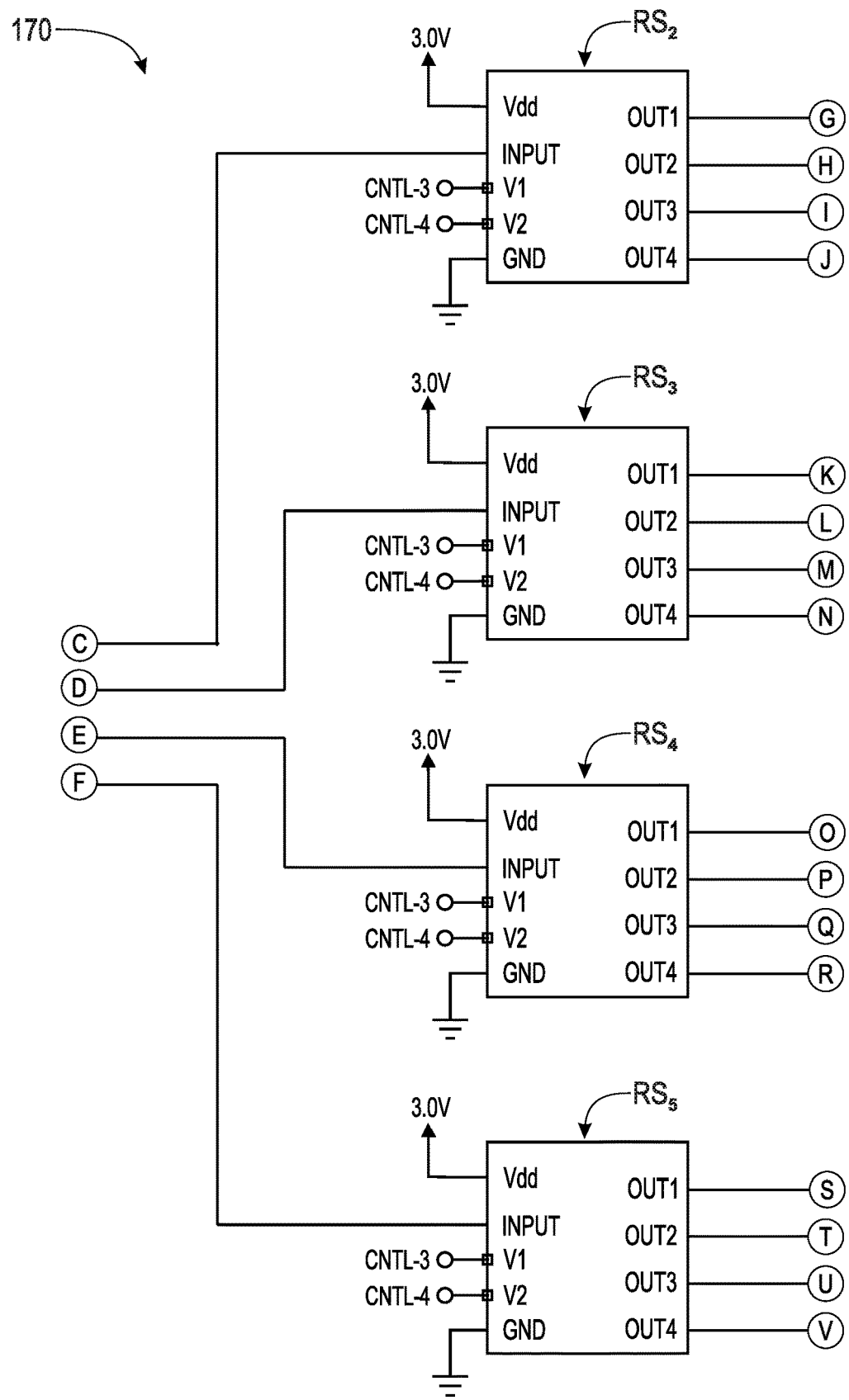
FIG. 13A is a partial schematic view of the control circuit of the present invention.
Figure 13B:
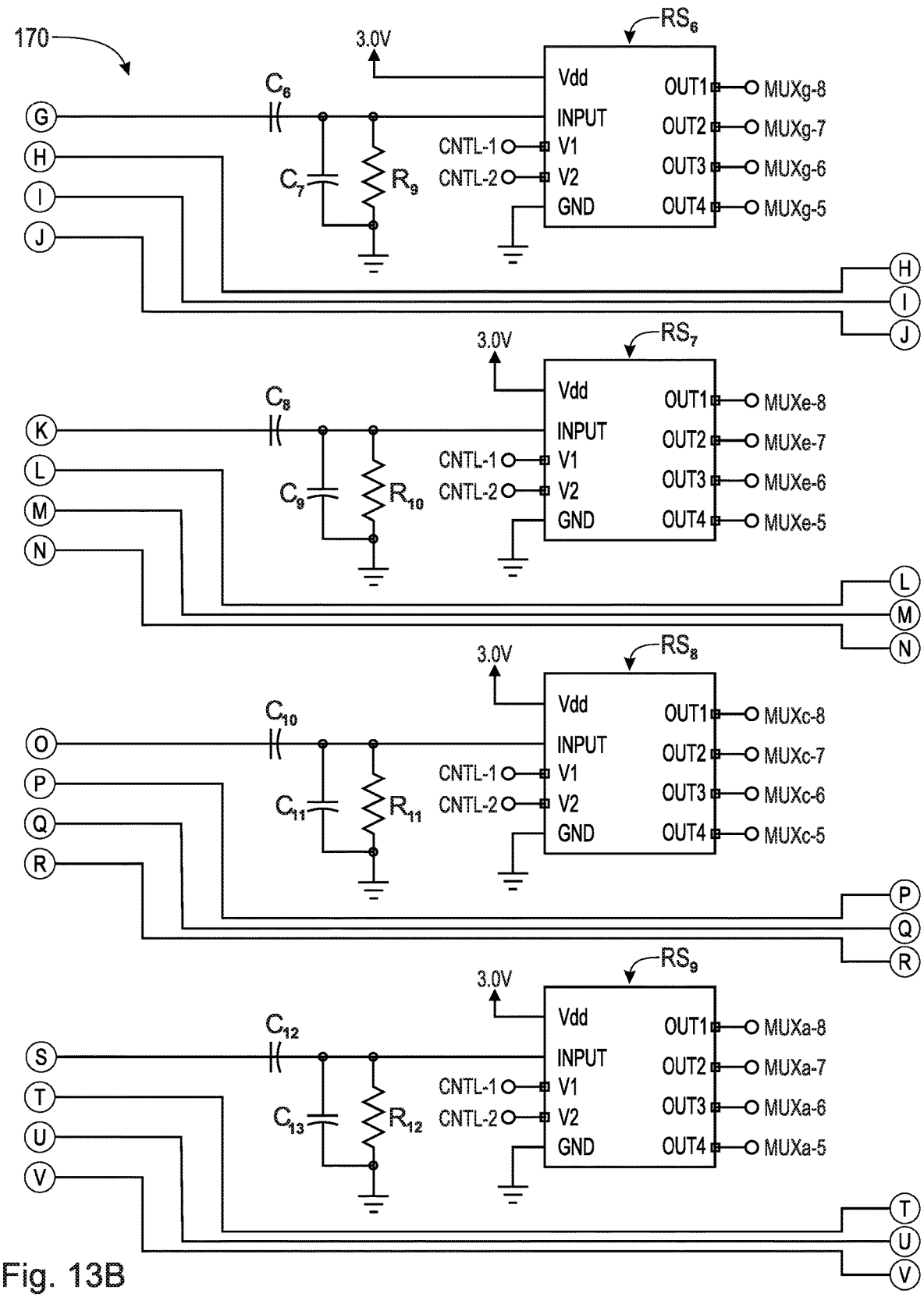
FIG. 13B is a partial schematic view of the control circuit of the present invention.
Figure 13C:
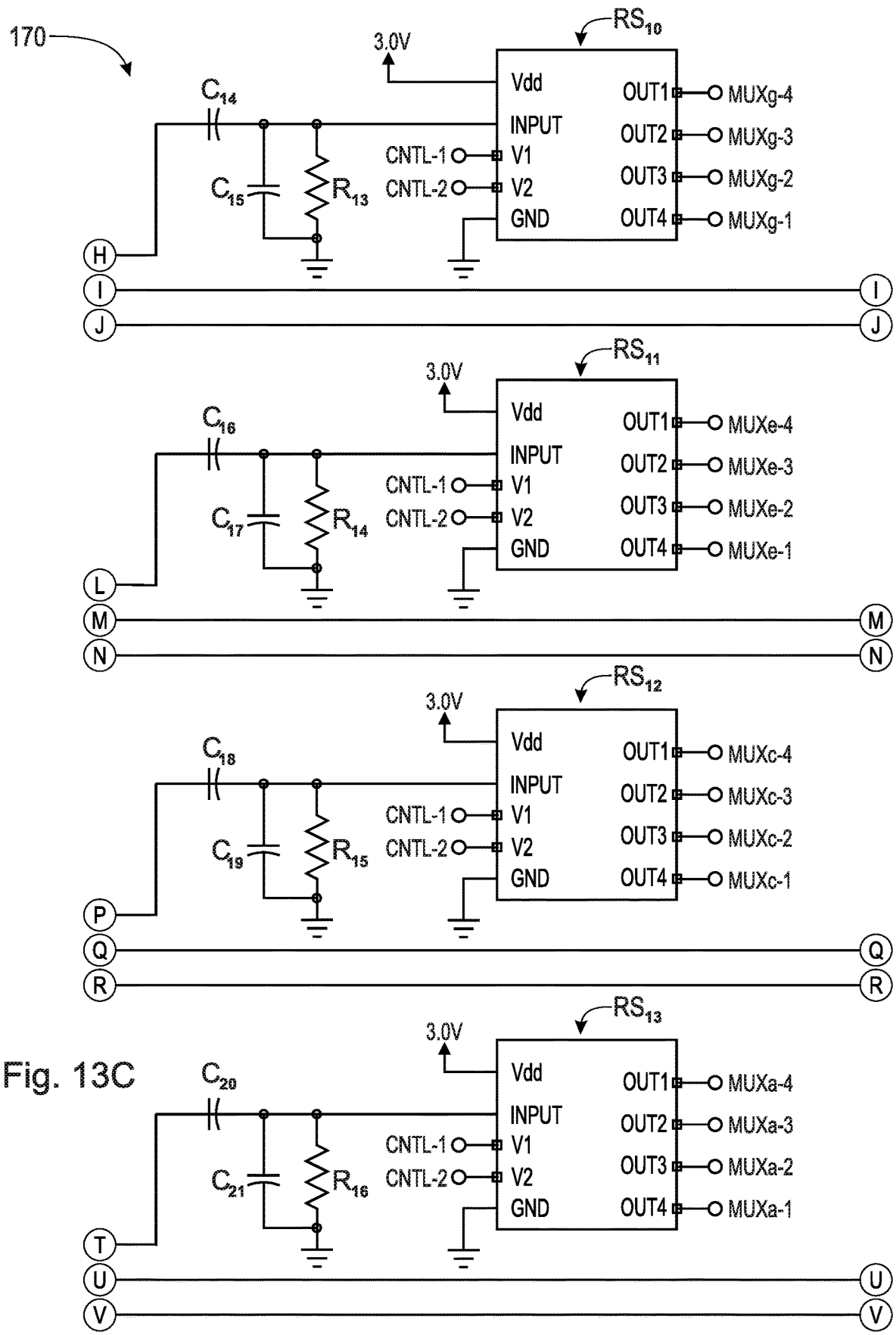
FIG. 13C is a partial schematic view of the control circuit of the present invention.
Figure 13D:
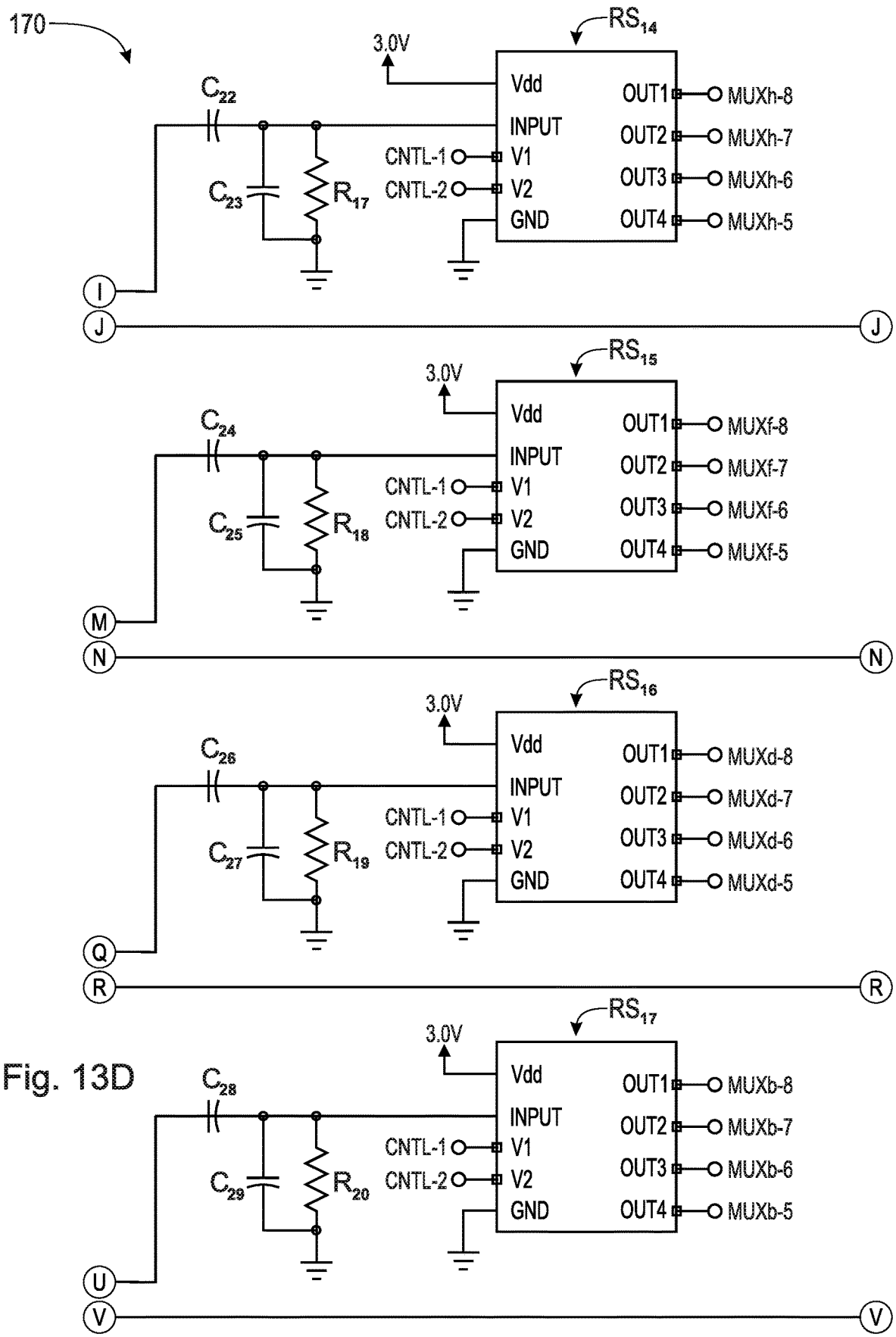
FIG. 13D is a partial schematic view of the control circuit of the present invention; and, FIG. 13E is a partial schematic view of the control circuit of the present invention.
Figure 13E:
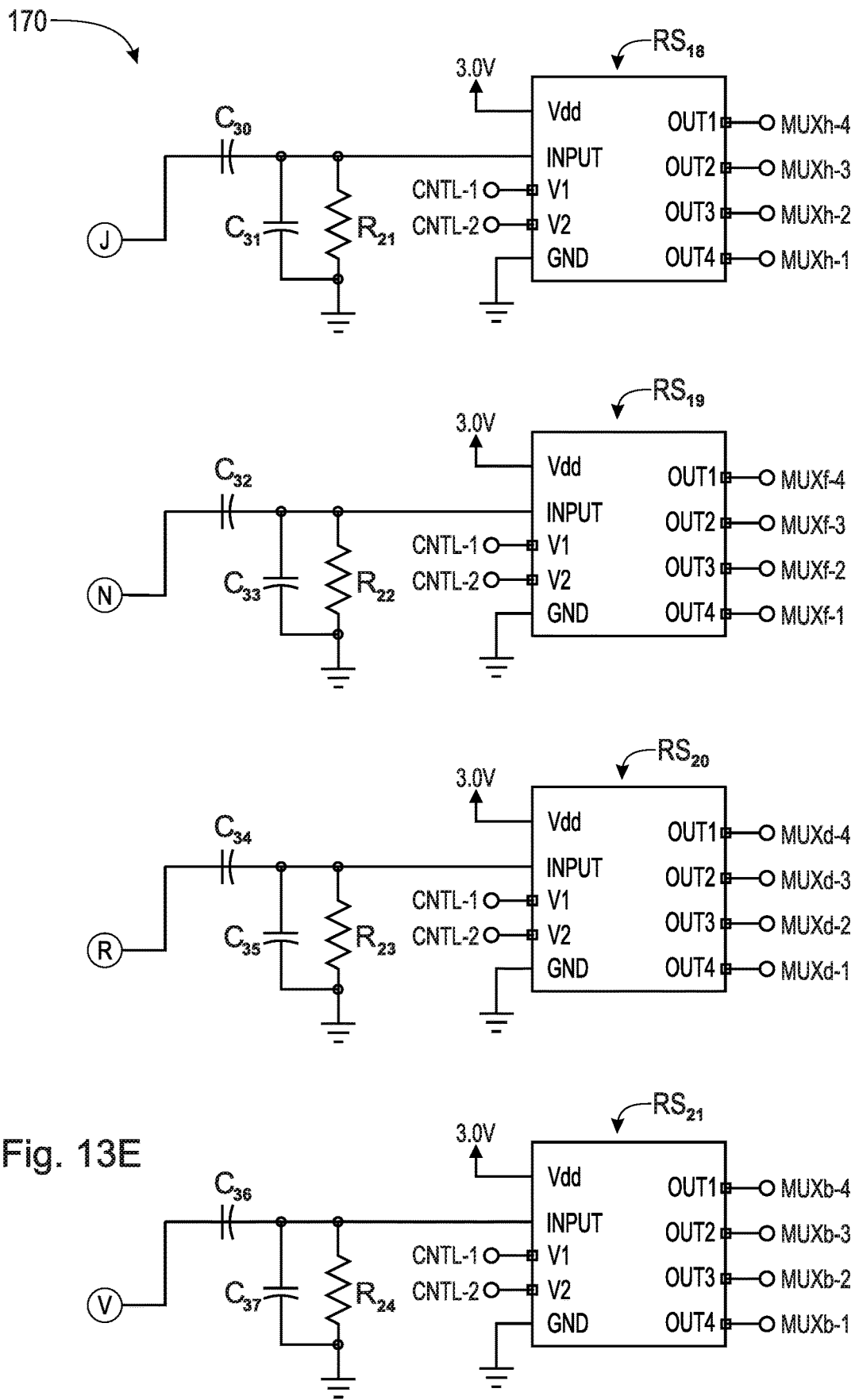

Relay 155 controls RF switch $RS_3$, the first in a line of identical RF switches, as will be discussed infra. The microcontroller also controls switch $RS_1$ via control lines CNTL-5 and CNTL-6. In a preferred embodiment, these switches, which include $RS_1$ through $RS_{21}$, are all identical, and are all Model 42440, manufactured by Peregrine Semiconductor Corp. All of the switches are controlled by the microcontroller via control lines. The four outputs C, D, E and F of $RS_1$ become the inputs for RF switches $RS_2$, $RS_3$, $RS_4$, and $RS_5$, as shown in FIG. 13A. These four switches, in turn, provide outputs G, H, I, J; K, L, M, N; O, P, Q, R; and S, T, U, V, respectively, which all become the inputs for switches $RS_6$-$RS_{21}$, respectively, as shown in FIGS. 13B-13E. As shown in the drawings, switches $RS_6$-$RS_{21}$ control multiplexing of the individual antennas under each square of the chessboard. For example, as shown in FIG. 13B, it is seen that $RS_6$ controls the antennas MUXg-8, MUXg-7, MUX g-6, and MUXg-5.

Circuit Operation

To begin operation, a user would connect the board via a USB port in a computer. The computer in combination with the board, will sense the initial position of the pieces and know that a new game is about to begin. Upon connection of the board to the computer the microcontroller will control a complete fresh scan of all 64 squares on the board. In a preferred embodiment, the microcontroller is programmed to scan all 64 squares in order from a-1 to a-8, from b-1 to b-8, from c-1 to c-8 . . . to h-1 to h-8, although the order of scanning all the squares on the board can obviously be changed. In a preferred embodiment, the scanning is done at a rate of approximately 5 ms per square, which is equivalent to approximately three scans of the entire board every second. Each time a square is scanned the result of the scan is transmitted to the microcontroller where it is stored in RAM memory, and also transmitted immediately to the computer via the USB connection. It is important to note that only one antenna is active at any time. So, only one square is being queried at any given time. All 64 squares are scanned in a rapid succession. If there is no response when querying one particular antenna, then the board electronic circuit assumes that there is not a chess piece or token at that square and it moves to the next square. When a change in the state of any square is detected (because a piece has left the square, or been placed on the square, etc.) this change of state is also communicated to the EEPROM, since this indicates that a move has been made, and the electronics of the invention records all moves made during a game.

The end of a game can be indicated and sensed in any number of ways. For example, a "White Wins" token can tell the computer that the player with white pieces was the winner of the game. Also, tokens like "Black Wins" or "Draw" can tell the computer that black won or the game was drawn respectively. Alternatively, certain pieces, such as Kings, can be placed on certain squares on the board to indicate game result. For example, placing the Kings on e4 and d5, two white squares, might indicate that White has won the game, while placing the Kings on d4 and e5, two black squares, would indicate that Black has won the game. Placing one King on a white square and one King on a black square might be used to indicate that the game has ended in a draw.

It should also be appreciated that, although in a preferred embodiment, a USB connection is established between the board and a computer, and the chessboard position is transmitted to the computer via this connection, that this information can also be transmitted using a Bluetooth or WiFi connection. A module is used to implement these two wireless connections. The WiFi connection can connect to a WiFi network's router or a smart cell phone. A chess game can thus be watched live in a website by using any of the three available connections.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMERALS 10 sensory chessboard
20 top layer of chessboard
24 square on printed circuit board
26 radio frequency identification antenna(s)
28 printed circuit board
30 white chess pieces
40 black chess pieces
50 computer
60 computer monitor
70 USB connector
80 body of white Rook WR
82 lead weight in white Rook WR
84 ferrite layer
86 RFID tag
88 felt, billiard cloth or leather base pad
89 unweighted chess piece
100 sensory chessboard system
110 microcontroller
135 EEPROM
140 WiFi module
$C_1$ 22 µF capacitor
$C_2$ 22 µF capacitor
$C_3$ 470 nF capacitor
$C_4$ 10 µF capacitor
$C_5$ 10 µF capacitor
$C_6$ 56 pF capacitor
$C_7$ 56 pF capacitor
$C_8$ 56 pF capacitor
$C_9$ 56 pF capacitor
$C_{10}$ 56 pF capacitor
$C_{11}$ 56 pF capacitor
$C_{12}$ 56 pF capacitor
$C_{13}$ 56 pF capacitor
$C_{14}$ 56 pF capacitor
$C_{15}$ 56 pF capacitor
$C_{16}$ 56 pF capacitor
$C_{17}$ 56 pF capacitor
$C_{18}$ 56 pF capacitor
$C_{29}$ 56 pF capacitor
$C_{20}$ 56 pF capacitor
$C_{21}$ 56 pF capacitor
$C_{22}$ 56 pF capacitor
$C_{23}$ 56 pF capacitor
$C_{24}$ 56 pF capacitor
$C_{25}$ 56 pF capacitor
$C_{26}$ 56 pF capacitor
$C_{27}$ 56 pF capacitor
$C_{28}$ 56 pF capacitor
$C_{29}$ 56 pF capacitor
$C_{30}$ 56 pF capacitor
$C_{31}$ 56 pF capacitor
$C_{32}$ 56 pF capacitor
$C_{33}$ 56 pF capacitor
$C_{34}$ 56 pF capacitor
$C_{35}$ 56 pF capacitor
$C_{36}$ 56 pF capacitor
$C_{37}$ 56 pF capacitor
$R_1$ 300Ω resistor
$R_2$ 300Ω resistor
$R_3$ 4.7 kΩ resistor
$R_4$ 4.7 kΩ resistor
$R_5$ 1 kΩ resistor
$R_6$ 4.7 kΩ resistor
$R_7$ 100 kΩ resistor
$R_8$ 100 kΩ resistor
$R_9$ 1 kΩ resistor
$R_{10}$ 1 kΩ resistor
$R_{11}$ 1 kΩ resistor
$R_{12}$ 1 kΩ resistor
$R_{13}$ 1 kΩ resistor
$R_{14}$ 1 kΩ resistor
$R_{15}$ 1 kΩ resistor
$R_{16}$ 1 kΩ resistor
$R_{17}$ 1 kΩ resistor
$R_{18}$ 1 kΩ resistor
$R_{19}$ 1 kΩ resistor
$R_{20}$ 1 kΩ resistor
$R_{21}$ 1 kΩ resistor $R_{22}$ 1 kΩ resistor
$R_{23}$ 1 kΩ resistor
$R_{24}$ 1 kΩ resistor
WR white Rook
$X_1$ 4 MHz quartz crystal oscillator

What is claimed is:

1. A chessboard, comprising:
    a top layer comprising sixty-four (64) squares of alternating color arranged in eight parallel ranks and eight parallel files, wherein the ranks are arranged perpendicularly to the files;
    a bottom layer comprising a circuit board, said circuit board comprising sixty-four (64) radio frequency identification antennas arranged in registration with said sixty-four (64) squares of alternating color in said top layer; and,
    an electronic circuit embedded in said circuit board operatively arranged to receive a unique digital code stored in a radio frequency identification tag in each chess piece positioned atop said chessboard and to sense positions and movement of said chess pieces on said sixty-four (64) squares of said top layer, and communicate said positions and movement to a computer,
    wherein said circuit board includes a circuit comprising said sixty four (64) radio frequency identification antennas,
    wherein each antenna comprises a coil etched into said circuit board, with each coil centrally located within a square of said chess board, wherein the width of each said coil is approximately 55% of the width of each square of said chess board.

2. The chessboard recited in claim 1, wherein said radio frequency identification tag in each chess piece is positioned below a metal weight in each said chess piece, wherein a ferrite sheet is positioned between said radio frequency identification tag and said metal weight in each said chess piece.

3. The chessboard recited in claim 1 wherein said top layer is made of wood.

4. The chessboard recited in claim 1 wherein said top layer is made of vinyl.

5. The chessboard recited in claim 1 wherein said top layer is made of polyester fabric with open cell sponge rubber.

6. The chessboard recited in claim 1, wherein each antenna is tuned to have an inductance of approximately 1.92 µH.

7. The chessboard recited in claim 1 wherein said circuit further comprises a microcontroller operatively arranged to control the sixty-four radio frequency identification antennas, by scanning each square on the chessboard in sequence, to detect and identify each chess piece, if any, on each said square.

8. The chessboard recited in claim 1, wherein said each chess piece further comprises:
    a body having a cavity therein;
    a metal weight positioned within said cavity;
    a ferrite sheet positioned below said metal weight and in proximity thereto; and,
    said radio frequency identification tag is positioned below said ferrite sheet, said radio frequency identification tag is secured to said body.

9. The chessboard recited in claim 8, wherein said each chess piece further comprises a base pad fixedly secured to said radio frequency identification tag.

10. The chessboard recited in claim 8, wherein said metal weight is made of lead.

11. The chessboard recited in claim 8, wherein said body is made of wood.

12. The chessboard recited in claim 8, wherein said body is made of plastic.

13. The chessboard recited in claim 8, wherein said body is made of bone.

14. The chessboard recited in claim 8, wherein said body is made of ivory.

* * * * *